United States Patent [19]

Jin et al.

[11] 3,883,463

[45] May 13, 1975

[54] FLAME RETARDANT BINDER FOR FLAMMABLE MATERIALS

[75] Inventors: Jung Il Jin, Irvington; Paul Kraft, Spring Valley, both of N.Y.

[73] Assignee: Stauffer Chemical Corporation, Westport, Conn.

[22] Filed: Sept. 27, 1973

[21] Appl. No.: 401,533

[52] U.S. Cl. ...... 260/29.4 UA; 106/15 FP; 117/137; 252/8.1; 260/29.6 T; 260/29.6 F; 260/29.6 TA; 260/29.6 MP; 260/29.6 MN; 260/851; 260/856

[51] Int. Cl. ............................................ C08g 51/24

[58] Field of Search .. 260/29.4 R, 29.4 UA, 29.6 T, 260/29.6 MP, 856, 851, 29.6 TA, 29.6 F, 29.6 MN; 106/15 FP; 117/136, 137; 252/8.1

[56] References Cited
UNITED STATES PATENTS

| 3,087,836 | 4/1963 | Dearborn | 260/29.4 UA |
|---|---|---|---|
| 3,428,480 | 2/1969 | Wagner et al. | 260/29.6 MP |
| 3,489,706 | 1/1970 | Mikofalvy | 260/29.6 T |
| 3,562,197 | 2/1971 | Sears et al. | 260/29.6 MP |
| 3,676,389 | 7/1972 | Putnam et al. | 106/15 FP |
| 3,691,127 | 9/1972 | Kraft et al. | 260/29.6 T |
| 3,725,509 | 4/1973 | Kraft et al. | 260/29.6 MP |
| 3,726,839 | 4/1973 | Jin | 260/29.6 T |

*Primary Examiner*—Lorenzo B. Hayes

[57] ABSTRACT

A flame retardant composition comprises the following components: (a) a polymer latex comprising (i) a bis(hydrocarbyl)vinyl phosphonate, preferably bis($\beta$-chloroethyl)vinyl phosphonate, (ii) a vinyl halide or vinylidene halide such as vinyl chloride or vinylidene chloride, (iii) an alkyl acrylate and optionally, (iv) another derivative of acrylic acid or methacrylic acid; (b) a phosphorus source selected from (i) a co-condensate of bis($\beta$-chloroethyl)vinyl phosphonate and dimethyl methyl phosphonate or a condensate of bis($\beta$-chloroethyl) vinyl phosphonate, (ii) tetrakis (hydroxymethyl) phosphonium halide or hydroxide, (iii) N-hydroxymethyl-3-(dimethylphosphoro) propionamide, (iv) tris(2,3-dibromopropyl phosphate), (v) water-insoluble ammonium polyphosphate and (vi) water-insoluble ammonium salt of metaphosphoroamidic acid; (c) urea; (d) an aminoplast selected from a melamine formaldehyde or urea formaldehyde; and (e) optionally, a phosphate plasticizer. These compositions are useful as binders, saturants, impregnants and coatings for flammable materials.

11 Claims, No Drawings

FLAME RETARDANT BINDER FOR FLAMMABLE MATERIALS

BACKGROUND OF THE INVENTION

Copolymers of vinyl halides, vinylidene halides and various phosphorus-containing vinyl monomers have been frequently used as fire retardant agents for various flammable materials, such as paper, cellulosic textiles and non-woven fabrics. For light weight and flexible substrates, there is a limit to how much polymer the substrates can pick up before flexibility and a soft hand are lost. In these cases, there is insufficient add-on to give reduced flammability. Inorganic salts such as diammonium phosphate and ammonium sulfamate have heretofore been used for this purpose; however, their water solubility has rendered their flame retardant property non-durable.

TECHNICAL DISCLOSURE OF THE INVENTION

It has now been found that excellent and non-afterglowing durable flame retardant properties are imparted to flammable materials when they are treated with a composition comprising the following components: (a) from about 20 to about 70 weight percent of a polymer latex, (b) from about 3 to about 50 weight percent of a phosphorus source, (c) from 0 to about 50 weight percent of urea, (d) a melamine formaldehyde or urea formaldehyde aminoplast in about 10 to about 50 weight percent, and (e) a phosphate plasticizer in 0 to about 20 weight percent. The components will now be more fully described.

Component (a) is a polymer latex derived from at least three monomers: (1) a bis(hydrocarbyl)vinyl phosphonate, (2) a vinyl halide or vinylidene halide, (3) an alkyl acrylate, and optionally (4) another derivative of acrylic or methacrylic acid as more fully described below.

The bis(hydrocarbyl)vinyl phosphonate has the structure:

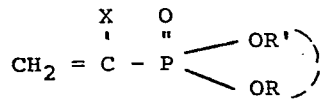

wherein X is selected from the group consisting of hydrogen, halogen, cyano, aryl such as phenyl, $C_1$—$C_{18}$ alkyl and

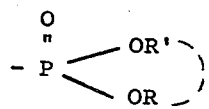

R and R' are hydrocarbyl and substituted hydrocarbyl groups consisting essentially of hydrogen and carbon and containing up to about 18 carbon atoms inclusive with the proviso that R and R' may be the same, different or conjoint, i.e., R and R' may combine to form one single radical.

The use, in this disclosure, of the expression "hydrocarbyl" and "substituted hydrocarbyl groups" in the definition of the suitable bis(hydrocarbyl)vinyl phosphonates given hereinabove refers to the radicals obtained upon the removal of a hydrogen from a hydrocarbon or substituted hydrocarbon group which may be either an aliphatic or aromatic group. These hydrocarbyl groups may be substituted with any non-interfering groups, i.e., with any group which does not interfere with the polymerization of the bis(hydrocarbyl)vinyl phosphonate. Such substituent groups include, for example, chloro, bromo, fluoro, nitro, hydroxy, sulfone, ethoxy, methoxy, nitrile, ether, ester and keto groups and the like.

Illustrative of the aliphatic and aromatic groups as are represented by R and R' in the structure of the bis(hydrocarbyl)vinyl phosphonate given hereinabove are alkyl groups, such as methyl, ethyl, propyl, butyl, pentyl, hexyl, nonyl, and the like; alkenyl groups such as pentenyl and hexenyl groups and all of their respective isomers; cycloalkyl groups, such as cyclopropyl, cyclobutyl, cyclopentyl, cyclohexyl, and the like; cycloalkenyl groups, such as cyclohexenyl, and the like; typical aryl groups include phenyl, benzyl, phenethyl, tolyl, naphthyl, and the like.

Representative of the above-defined bis(hydrocarbyl) vinyl phosphonates are:
bis(β-chloroethyl)vinyl phosphonate;
bis(β-chloropropyl)vinyl phosphonate;
bis(β-chloroethyl) 1-methylvinyl phosphonate;
bis(β-chloroethyl) 1-cyanovinyl phosphonate;
bis(β-chloroethyl) 1-chlorovinyl phosphonate;
bis(β-chloroethyl) 1-phenylvinyl phosphonate;
dimethyl vinyl phosphonate;
diethyl vinyl phosphonate;
bis(ω-chlorobutyl)vinyl phosphonate;
di-n-butyl vinyl phosphonate;
di-isobutyl vinyl phosphonate;
bis(2-chloroisopropyl) 1-methylvinyl phosphonate;
diphenyl vinyl phosphonate; and
bis(2,3-dibromopropyl)vinyl phosphonate From the group of bis(hydrocarbyl)vinyl phosphonate monomers, it is preferred to employ bis(β-chloroethyl)vinyl phosphonate in preparing the novel aqueous emulsion polymers of this invention since the latter monomer is a commercially available material and lower in cost than any of the other bis(hydrocarbyl)vinyl phosphonates.

The vinyl halide or vinylidene halide may be, for example, vinyl chloride, vinyl bromide, vinyl fluoride, vinylidene chloride, vinylidene bromide, vinylidene chlorobromide or vinylidene fluoride. Preferred are vinyl chloride and vinylidene chloride.

The alkyl acrylate may be any $C_1$ to $C_{20}$ alkyl ester of acrylic acid, such as methyl acrylate, ethyl acrylate, n-butyl acrylate, sec.-butyl acrylate, 2-ethylhexyl acrylate, lauryl acrylate or mixture thereof. Preferred monomers are the $C_4$—$C_8$ alkyl acrylates such as n-butyl acrylate and 2-ethylhexyl acrylate.

The fourth monomer is another derivative of acrylic acid or a derivative of methacrylic acid, or may be the respective acids themselves. Among the derivatives are the amides and the N-methylol and diacetone derivatives of the amides. Preferred are N-methylol acrylamide, acrylamide, acrylic acid and methacrylic acid.

The proportions of the various monomers forming component (a) are as follows: from about 10 to about 75 weight percent of bis(hydrocarbyl)vinyl phosphonate, from about 20 to about 85 weight percent of vinyl halide or vinylidene halide, from about 5 to about 35 weight percent of alkyl acrylate, and from 0 to about 10 weight percent of the fourth comonomer.

Specific latex polymers for component (a) include the following:

1. a terpolymer of 30 parts by weight of vinylidene chloride, 20 parts by weight of n-butyl acrylate and 50 parts by weight of bis(beta-chloroethyl)vinyl phosphonate;
2. a terpolymer containing 15 parts by weight of di-n-butyl vinyl phosphonate, 20 parts by weight of di-2-ethylhexyl acrylate and 65 parts by weight of vinylidene chloride;
3. a polymer containing 50 parts of bis(betachloroethyl)vinyl phosphonate, 25 parts of vinylidene chloride, 20 parts of 2-ethylhexyl acrylate, and 5 parts of N-methylol acrylamide;
4. a polymer containing 45 parts by weight of vinylidene chloride, 35 parts by weight of bis(betachloroethyl) vinyl phosphonate, 15 parts by weight of n-butyl acrylate and 5 parts by weight of N-methylol acrylamide; and
5. a polymer containing 30 parts by weight of bis(beta-chloroethyl)vinyl phosphonate, 5 parts by weight of propylene, 60 parts by weight of vinyl chloride and 5 parts by weight of N-methylol acrylamide.

The polymers of the present invention can be prepared by means of free radical initiated emulsion polymerization techniques well known to those skilled in the art. In these procedures, the various monomers and catalysts are emulsified, in water, by means of one or more surface-active emulsifiers whereupon the polymerization reaction is then initiated. Suitable water soluble, free radical initiating catalysts for use in preparing the copolymer latices of this invention include sodium, potassium and ammonium persulfate and hydrogen peroxide or one may use a redox system such, for example, as a mixture of a persulfate with an alkali metal bisulfite, thiosulfate or hydrosulfite. These catalysts should be present in a concentration of from about 0.05 to 5.0 percent, by weight, of the total monomer charge. With respect to the emulsifier or surfactant, it is possible to utilize one or more anionic, cationic, or non-ionic emulsifiers such, for example, as the alkyl carboxylic acid salts, the alkyl sulfate, sulfonate, phosphate, or sulfosuccinamate salts; the alkyl aryl ether alcohols, and the alkyl aryl polyether sulfate salts. The selected emulsifier or emulsifiers should be present in effective concentration of from about 0.3 to 6.0 percent, by weight, of the total monomer charge. In addition, a protective colloid such as polyvinyl alcohol, polyvinyl pyrrolidone, methyl cellulose or gelatin can also, if desired, be present in the recipe in an effective concentration of from about 0.03 to 6.0 percent, by weight, of the total monomer charge. Alternatively, the protective colloid may be introduced into the copolymer latex subsequent to its preparation. When post-added in this manner, the protective colloid should be present in a concentration of from about 0.03 to 6.0 percent, by weight, of the total resin solids. In any event, the presence of the protective colloid serves to enhance the mechanical stability of the emulsion.

The actual polymerization reaction will ordinarily be conducted at a temperature of from about 0° to 100°C. for a period of from about 1 to 24 hours, depending upon such factors as the particular monomer, catalysts, surfactants and polymerization apparatus that is being utilized. The latices resulting from this polymerization process will ordinarily have a resin solids content of from about 5 to 70 percent, by weight, wherein the particles have a diameter which ranges in size from about 0.03 to 3.0 microns.

Component (b) is a source of phosphorus selected from the following: (i) a co-condensate of bis($\beta$-chloroethyl)vinyl phosphonate and dimethyl methyl phosphonate or a condensate of bis($\beta$-chloroethyl)vinyl phosphonate, (ii) tetrakis (hydroxymethyl) phosphonium halide or hydroxide, (iii) (N-hydroxymethyl-3-dimethylphosphoro) propionamide, (iv) tris(2,3-dibromopropyl)phosphate, (v) water-insoluble ammonium polyphosphate, and (vi) water-insoluble ammonium salt of metaphosphoroamidic acid.

The co-condensate of bis($\beta$-chloroethyl)vinyl phosphonate and dimethyl methyl phosphonate or the condensate of vinyl phosphonate is prepared by heating the mixtures of the two components or bis($\beta$-chloroethyl)-vinyl phosphonate alone at about 100° to 250°C. with a basic catalyst for about 2 to 12 hours resulting in a fluid liquid. A mixture of ethylene dichloride and methyl chloride or ethylene dichloride is generated as a by-product.

Tetrakis(hydroxymethyl) phosphonium chloride or hydroxide, also known as THPC or THPOH has the structure:

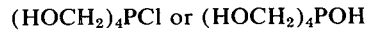

and is sold by Hooker Chemical Corporation, a division of Occidental Petroleum Corporation.

N-hydroxymethyl-3-(dimethylphosphoro)propionamide has the structure:

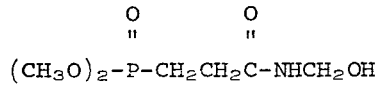

and is sold under the trademark PYROVATEX CP by Ciba-Geigy Corporation.

Tris(2,3-dibromopropyl phosphate) has the structure:

and is sold under the trademark FYROL HB32 by Stauffer Chemical Company.

Water-insoluble ammonium polyphosphate is made by heating ammonium phosphate with urea, and is known commercially as PHOSCHEK P30 sold by Monsanto Company.

The water-insoluble ammonium salt of metaphosphoramidic acid is made by the reaction of ammonia with phosphorus pentoxide.

The term "water-insoluble" is meant to denote that the solubility of the phosphorus compound in water is less than 25g/100cc at 10°C. or less than 75g/100cc at 70°C.

Component (c), whose presence is optional, is urea.

Component (d) is a melamine formaldehyde or urea formaldehyde aminoplast. Typical aminoplasts include such melamine/formaldehyde resins as AEROTEX M-3, AEROTEX 23 Special, AEROTEX MW and AEROTEX Resin 44, all of said resins being available from American Cyanamid Company.

Component (e), whose presence is also optional, is a phosphate plasticizer. To illustrate, it can be alkyl acid phosphates, i.e., methyl acid phosphate, butyl acid phosphate; trialkyl phosphates, i.e., trioctyl phosphate, tridodecyl phosphate; triaryl phosphates, i.e., tricresyl phosphate, cresyl diphenyl phosphate, i.e., octyl diphenyl phosphate, butyl dicresyl phosphate, and the like.

The flammable materials treated by the compositions of this invention include cellulose, regenerated cellulose such as rayon cellulose esters and mixed esters such as, for example, cellulose nitrate, cellulose acetate, cellulose acetate-butyrate, cellulose acetate propionate and cellulose ethers such as, for example, ethyl cellulose and combinations thereof. In addition, these flammable materials can be blended with polyesters such as polyethylene terephthalate, poly(cyclohexane-1,4-dimethylene) terephthalate; polyamides; mineral fibers such as asbestos and glass fibers. The flammable materials can be in the form of paper, woven textile fabrics or non-woven fabrics.

The binder compositions are applied to the flammable material by methods well known in the art, such as, for example, by immersion in a bath containing the binder, or by knife-coating.

The practice of this invention is shown by the following examples, which are included here for purposes of illustration only and are not intended as limitations.

EXAMPLE 1

A polymer latex composition was prepared having the following constituents: 48 percent bis($\beta$-chloroethyl)vinyl phosphonate, 29 percent vinylidene chloride, 19 percent n-butyl acrylate, and 4 percent N-methylol acrylamide, all percentages being by weight. The composition was prepared as an emulsion of 50 percent of solid content.

A pad bath was then charged with:
- 100g — above-described polymer latex (50 percent active)
- 10g — co-condensate of bis($\beta$-chloroethyl)vinyl phosphonate and dimethyl methyl phosphonate (100 percent active)
- 25g — melamine-formaldehyde condensate, AEROTEX M-3, American Cyanamid Company (50 percent active)
- 20g — urea
- 0.8g — $(NH_4)_2S_2O_8$
- 50g — $H_2O$ A sample of 1½ ounce/square yard weight commercial non-woven cellulosic is employed as the flammable substrate. The mixture in the pad bath was stirred to uniformity, and samples of the cellulosic cloth immersed therein. The excess liquid was squeezed out and the sample cured at 170°C. for 8 minutes. The dried samples were then burned according to AATCC method 34–1966. The results of the burn test are as follows:

| % Add On | Char Length After Test |
|---|---|
| 50 | 3″ — non-burning |
| 40 | 4½″ — non-burning |
| 30 | 5″ — non-burning |
| 25 | 6″ — non-burning |
| 20 | 6¼″ — non-burning |
| 0 | burn entire length |

The samples were also washed for 5 minutes at 30°C. in water to test retention of fire retardant properties. The fire retardant properties remained.

EXAMPLE 2

In this example, the flammable substrate is a cloth of 65/35 blend of polyester/rayon. The same pad bath and the procedure as employed in Example 1 gave a flame retardant fabric, the flame retardant property of which was not lost by washing.

EXAMPLES 3–5

In these examples, the co-condensate of bis($\beta$-chloroethyl)vinyl phosphonate and dimethyl methyl phosphonate in the formulation of Example 1, was replaced by an equal weight of PYROVATEX CP, THPOH, PHOSCHECK P30, respectively. The resulting baths imparted durable flame retardant properties to textile fabrics and non-woven fabrics, which if not treated with the latex will burn the entire length by the test described in Example 1.

What is claimed is:

1. A flame retardant polymeric latex binder composition comprising (a) from about 20 to about 70 weight percent of a polymer latex containing:

1. from about 10 to about 75 weight percent of a bis(hydrocarbyl)vinyl phosphonate of the formula:

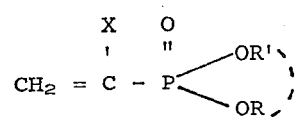

wherein X is selected from the group consisting of hydrogen, halogen, cyano, phenyl, $C_1$—$C_{18}$ alkyl and

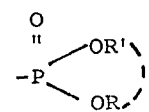

and each of R and R' are hydrocarbyl or substituted hydrocarbyl having substituents selected from the group consisting of chloro, bromo, fluoro, nitro, hydroxy, sulfone, ethoxy, methoxy, nitrile, ether, ester and keto groups, said hydrocarbyl or substituted hydrocarbyl having from 1 to 18 carbon atoms, 2. from about 20 to about 85 weight percent of a vinyl halide or vinylidene halide,
   3. from about 5 to about 35 weight percent of a $C_1$–$C_{20}$ alkyl ester of acrylic acid, and optionally,
   4. from 0 to about 10 weight percent of a comonomer selected from the group consisting of acrylic acid, methacrylic acid, amides of acrylic acid and methacrylic acid, the N-methylol derivatives of the amides of acrylic acid and methacrylic acid, and diacetone derivatives of the amides of acrylic acid and methacrylic acid, (b) from about 3 to about 50 weight percent of a phosphorus containing compound selected from the group consisting of, a co-condensate of bis($\beta$-chloroethyl)vinyl phosphonate and dimethyl methyl phosphonate, a condensate of bis($\beta$-chloroethyl) vinyl phosphonate, tetrakis(hydroxymethyl)phosphonium chloride or hydroxide, N-hydroxymethyl-3-(dimethylphosphoro)propionamide, tris(2,3-dibromopropylphosphate), and water-insoluble ammonium polyphosphate, water-insoluble ammonium salt of metaphosphoramidic acid and mixtures thereof, said water-insoluble phosphorus compounds being characterized by a water solubility of less than 25 g/100 cc at 10°C., (c) from 0 to about 50 weight percent of urea, (d) from about 10 to about 50 weight percent of an aminoplast selected from the group consisting of a melamine formaldehyde or a urea formaldehyde, and (e) from 0 to about 20 weight percent of a phosphate plasticizer.

2. A composition according to claim 1 in which, in the bis(hydrocarbyl)vinyl phosphonate, each of R and R' are alkyl, alkenyl, cycloalkyl or cycloalkenyl.

3. A composition according to claim 1 in which the bis(hydrocarbyl)vinyl phosphonate is selected from the group consisting of:
bis($\beta$-chloroethyl)vinyl phosphonate;
bis($\beta$-chloropropyl)vinyl phosphonate;
bis($\beta$-chloroethyl) 1-methylvinyl phosphonate;
bis($\beta$-chloroethyl) 1-cyanovinyl phosphonate;
bis($\beta$-chloroethyl) 1-chlorovinyl phosphonate;
bis($\beta$-chloroethyl) 1-phenylvinyl phosphonate;
dimethyl vinyl phosphonate;
diethyl vinyl phosphonate;
bis($\omega$-chlorobutyl)vinyl phosphonate;
di-n-butyl vinyl phosphonate;
di-isobutyl vinyl phosphonate;
bis(2-chloroisopropyl) 1-methylvinyl phosphonate;
diphenyl vinyl phosphonate; and
bis(2,3-dibromopropyl)vinyl phosphonate.

4. A composition according to claim 3 in which the bis(hydrocarbyl)vinyl phosphonate is bis($\beta$-chloroethyl)vinyl phosphonate, the vinyl halide is vinyl chloride, the vinylidene halide is vinylidene chloride, the alkyl ester of acrylic acid is n-butyl acrylate or 2-ethylhexyl acrylate, and the comonomer is selected from the group consisting of acrylic acid, methacrylic acid, acrylamide and N-methylol acrylamide.

5. Composition according to claim 4 in which the phosphorus containing compound is a co-condensate of bis($\beta$-chloroethyl)vinyl phosphonate and dimethyl methyl phosphonate.

6. Composition according to claim 4 in which the phosphorus containing compound is (N-hydroxymethyl-3-dimethylphosphoro)propionamide.

7. Composition according to claim 4 in which the phosphorus containing compound is tetrakis(hydroxymethyl) phosphonium chloride or hydroxide.

8. Composition according to claim 4 in which the phosphorus containing compound is tris(2,3-N-dibromopropyl phosphonate).

9. Composition according to claim 4 in which the phosphorus containing compound is ammonium polyphosphate.

10. Composition according to claim 4 in which the phosphorus containing compound is ammonium salt of metaphosphoramidic acid.

11. Composition according to claim 4 in which the phosphorus containing compound is a condensate of bis($\beta$-chloroethyl)vinyl phosphonate.

* * * * *